(12) United States Patent
Lerner

(10) Patent No.: US 10,065,507 B1
(45) Date of Patent: Sep. 4, 2018

(54) SPEED RESTRICTION SYSTEMS USING EDDY CURRENTS

(71) Applicant: ZIP-FLYER, LLC, New York, NY (US)

(72) Inventor: Shawn Geoffrey Lerner, New York, NY (US)

(73) Assignee: ZIP-FLYER, LLC, New York, NY (US)

( * ) Notice: Subject to any disclaimer, the term of this patent is extended or adjusted under 35 U.S.C. 154(b) by 19 days.

(21) Appl. No.: 15/726,939

(22) Filed: Oct. 6, 2017

(51) Int. Cl.
*B60L 7/28* (2006.01)
*B61H 7/08* (2006.01)
*B61H 9/02* (2006.01)
*H02K 49/04* (2006.01)
*A63G 21/22* (2006.01)

(52) U.S. Cl.
CPC ............. *B60L 7/28* (2013.01); *B61H 7/083* (2013.01); *B61H 9/02* (2013.01); *H02K 49/04* (2013.01); *H02K 49/046* (2013.01); *A63G 21/22* (2013.01)

(58) Field of Classification Search
CPC ........ B60L 7/28; H02K 49/04; H02K 49/043; H02K 49/046; H02K 7/104; A62B 1/08; B60T 13/748; B61H 9/02
USPC ....................................................... 188/267
See application file for complete search history.

(56) References Cited

U.S. PATENT DOCUMENTS

| | | | | |
|---|---|---|---|---|
| 4,567,963 A * | 2/1986 | Sugimoto | ............... | A62B 1/08 182/231 |
| 5,234,083 A * | 8/1993 | Lee | ....................... | H02K 49/043 188/159 |
| 6,412,611 B1 * | 7/2002 | Pribonic | .................. | B60L 7/28 187/375 |
| 7,018,324 B1 * | 3/2006 | Lin | ..................... | A63B 21/0052 188/158 |
| 8,025,131 B1 * | 9/2011 | Boren | .................... | A63G 21/22 188/165 |
| 8,037,978 B1 * | 10/2011 | Boren | .................... | H02K 49/04 104/281 |
| 8,490,751 B2 * | 7/2013 | Allington | ................. | A62B 1/08 182/234 |
| 8,851,235 B2 * | 10/2014 | Allington | ................. | A62B 1/08 182/234 |
| 9,016,435 B2 * | 4/2015 | Allington | ................. | A62B 1/08 182/230 |
| 9,242,659 B2 * | 1/2016 | Bernier | .................... | B61H 9/02 |
| 2002/0162477 A1 * | 11/2002 | Palumbo | .................. | B61B 7/00 104/87 |
| 2002/0179372 A1 * | 12/2002 | Schreiber | ................. | A62B 1/10 182/238 |
| 2003/0116391 A1 * | 6/2003 | Desta | ........................ | B60L 7/28 188/267 |

(Continued)

*Primary Examiner* — Zachary L Kuhfuss
(74) *Attorney, Agent, or Firm* — Mintz Levin Cohn Ferris Glovsky & Popeo, P.C.

(57) ABSTRACT

The current subject matter describes a device and system including one or more movable arms containing one or more magnets that are caused to move relative to a non-ferrous material by motion of the device to generate eddy currents that cause a braking of the device. Devices of this disclosure may include a wheel with arms having magnets and that move from centrifugal force caused by rotation of the arms within a wheel. The applied braking force is controlled due, in part, to the configuration of the non-ferrous material in which eddy currents are generated. Devices may additionally or alternately include arms with magnets that move relative to a non-ferrous rail when the device moves to generate eddy currents that cause additional braking of the device.

17 Claims, 13 Drawing Sheets

(56) References Cited

U.S. PATENT DOCUMENTS

| | | | | |
|---|---|---|---|---|
| 2004/0055836 A1* | 3/2004 | Pribonic | ................... | B60L 7/28 188/164 |
| 2004/0262103 A1* | 12/2004 | Rosner | ..................... | B60L 7/28 188/164 |
| 2005/0146213 A1* | 7/2005 | Imanishi | ............. | H02K 49/046 303/152 |
| 2006/0278478 A1* | 12/2006 | Pribonic | ............... | B61H 7/083 188/159 |
| 2009/0178887 A1* | 7/2009 | Reeves | ................... | A62B 1/10 182/239 |
| 2010/0107919 A1* | 5/2010 | Perakis | ................ | A63G 21/22 104/112 |
| 2010/0308149 A1* | 12/2010 | Allington | ................ | A62B 1/08 242/379 |
| 2011/0162917 A1* | 7/2011 | Steele | ................... | A63G 21/22 188/65.2 |
| 2012/0055740 A1* | 3/2012 | Allington | ................ | A62B 1/08 182/231 |
| 2013/0118842 A1* | 5/2013 | Lerner | ................... | B61H 9/02 188/62 |
| 2013/0327242 A1* | 12/2013 | Bernier | ................... | B61H 9/02 104/113 |
| 2014/0048639 A1* | 2/2014 | Allington | ................ | A62B 1/08 242/396 |
| 2015/0196820 A1* | 7/2015 | Allington | ................ | A62B 1/08 182/239 |
| 2017/0237313 A1* | 8/2017 | Diehl | ................... | H02K 7/104 310/93 |
| 2017/0244313 A1* | 8/2017 | Diehl | ....................... | B60L 7/28 |
| 2017/0274261 A1* | 9/2017 | Allington | ................ | A62B 1/08 |

\* cited by examiner

SPEED RESTRICTION SYSTEMS USING EDDY CURRENTS

TECHNICAL FIELD

The subject matter described herein relates to devices and systems that restrict or otherwise control the linear and/or angular velocity of one or more moving bodies using eddy currents. The subject matter described herein also includes braking systems having one or more movable arms or arm assemblies with one or more magnets that move relative to one or more non-ferrous conductive materials so as to generate eddy currents and provide braking force.

BACKGROUND

Indoor and outdoor high-adventure activity centers and theme parks featuring thrilling amusements like obstacle courses, zip-lining, wall climbs and human coaster rides, are becoming increasingly more popular throughout the world. Paramount considerations for theme parks and other venues offering these attractions include safety, scalability and increased thru-put. These considerations are particularly acute with respect to zip-line courses and human coaster rides, where riders are moving at fast speeds at high elevations and depend on the reliability and operation of the mechanical devices and systems making up the zip-line courses and coaster rides. The theme parks, adventure centers and other venues offering these high-excitement rides also need systems that are easily scalable so as to accommodate various types of riders and ride experiences and that also have satisfactory thru-put, i.e., are able to accommodate multiple riders at the same time on a single ride to keep the size of waiting lines down and/or moving.

Both zip-lining and coastering are amusements that depend upon gravitational force for moving riders, rather than a motor that accelerates and decelerates riders in a controlled manner. More specifically, the zip-line or coaster track(s) over which a rider and the trolley or trolley system traverses often begin at an elevation that is higher than that at which the zip line or coaster track(s) finish. Zip lines and coaster track(s) may also contain varying elevations that cause the rider and its trolley system to accelerate and decelerate and generally move along the zip line or coaster track(s), similar to how a passenger cart moves along a traditional roller coaster. Accordingly, because these amusements do not rely on a motor for controlling movement, but rather simply work on gravitational force, motion of the rider and the trolley must be controlled by braking, dictated either by implementing changes in the grade or elevation of the zip line or coaster track(s) and/or braking components contained on the trolley or trolley system and/or the zip line or coaster track(s) themselves.

Braking based on the grade of the zip line or coaster track(s) has attendant dangers, as the degree of acceleration and deceleration of the trolley will vary with the weight of the rider and the degree of slope of the cable, leaving operators of zip-line and coaster rides with little control over the speed of a rider once the trolley has left the starting location and is moving along the track(s). Accordingly, incorporating braking technologies into the trolley itself has gained favor and become prevalent on zip-line and/or coaster amusements.

With that said, conventional mechanical braking systems implemented directly on trolleys and trolley systems and on zip-line and coaster rides still lack important features, including providing progressive speed restriction of the trolley and its rider at the terminal section of the zip-line and/or coaster where the ride ends, providing a single trolley system that accommodates and performs effective braking for riders of a wide range of sizes (e.g., height and weight) and providing a trolley that can be controlled and brought to a stop as needed at any point along the zip-line or coaster ride.

SUMMARY

Devices and systems are described for providing progressive braking of a trolley or trolley system along a zip line and/or one or more coaster tracks. Devices and systems are also described for providing a trolley or trolley system that is capable of accommodating and performing effective braking for riders of vastly different heights and weights. Devices and systems are also described for providing a trolley or trolley system that can be controlled and stopped at any position along a zip line or one more coaster tracks, for example, to avoid collisions with one or more other trolleys or trolley systems traversing the same zip line or coaster track(s).

These device and systems may involve one or more arms or arm assemblies having one or more magnets positioned in close proximity to one or more non-ferrous conductive materials. Movement of the one or more magnets may be imparted by centrifugal or inertial forces or by way of a mechanical or electromechanical system, such as an actuator. Movement of the one or more magnets in proximity to one or more non-ferrous conductive materials will provide for the generation of eddy currents that impart a force upon the one or more magnets that opposes the movement of the one or more magnets. This opposing force upon the one or more magnets in turn results in a braking force upon the entire trolley or trolley system in which the one or more magnets are contained.

Implementations of the devices and systems described herein may include one or more magnets positioned within a movable arm that is attached to a main body and that moves through a radial pivoting motion caused by rotational movement of the main body. Movement of the movable arm may be caused by centrifugal or inertial force generated by movement of the moving body and components therein.

Implementations of the devices and systems described herein may include a wheel of a trolley or trolley system. The wheel may have one or more movable arms with one or more magnets. Each movable arm may move relative to and adjacent to a non-ferrous conductive material when the wheel rotates, such that the one or more magnets induce eddy currents in the non-ferrous conductive material that interfere with and oppose magnetic fields of the one or more magnets and exert an overall drag force on the movement of the one or more magnets to cause a braking force upon the rotation of the wheel and, in turn, the trolley or trolley system in which the wheel is incorporated.

Implementations of the devices and systems described herein may involve one or more moveable arms or brake arm assemblies pivotally attached to a trolley or trolley system that move relative to and in close proximity to (e.g., adjacent to) a track fin of non-ferrous conductive material. Movement of the one or more moveable arms or brake arm assemblies in close proximity to the track fin induces eddy currents in the track fin that interact with and oppose magnetic fields of the one or more magnets and exert an overall drag force on the movement of the one or more magnets to cause a braking force upon the trolley. The drag force imparted upon the one or more moveable arms or brake arm assemblies may also cause the one or more moveable arms or brake arm assemblies to pivot.

In one aspect, a trolley is described that can include a wheel, one or more arms operably coupled to the wheel, and one or more magnets attached to each of the one or more arms, and a plate. The wheel can be configured to rotate. The one or more arms can be configured to move from a closed position to a deployed position due to centrifugal force caused by rotation of the wheel. The one or more magnets can be attached to each of the one or more arms. The plate can be made of non-ferrous conductive material and can be located adjacent to the one or more magnets when the one or more arms are in the closed position and the deployed position. The movement of each of the one or more arms relative to the plate can generate eddy currents that create magnetic fields opposing the rotation of the wheel.

In some variations, one or more of the following can be implemented either individually or in any feasible combination. The trolley can further include one or more braking arms that can be operably coupled to the wheel. The one or more magnets can be attached to each of the one or more braking arms. The one or more braking arms can pivot relative to the wheel and into a position adjacent to a rail made of non-ferrous conductive material. The movement of each braking arm relative to the rail can generate eddy currents that create magnetic fields opposing movement of the apparatus. Each of the one or more arms can be operably coupled to a spring that can apply a force opposing movement of the arm. In one implementation, each of the one or more braking arms can be operably coupled to a spring that opposes the moving of each of the one or more braking arms toward the rail. The spring can be a gas spring.

The plate can have a first section that can be a first linear distance away from the one or more magnets attached to each of the one or more arms when at least one of the one or more magnets is directly adjacent to the first section. The plate can have a second section that can be a second linear distance away from the one or more magnets attached to each of the one or more arms when at least one of the one or more magnets is directly adjacent to the second section. The second linear distance can be less than the first linear distance. The amount of eddy currents generated when at least one of the one or more magnets is directly adjacent to the second section can be greater than the amount of eddy currents generated when at least one of the one or more magnets is directly adjacent to the first section. Each of the one or more arms can be operably coupled to a spring that can apply a force opposing movement of the arm.

In another aspect, a system is described that can include a wheel, one or more arms operably coupled to the wheel, one or more magnets attached to each of the one or more arms, a plate, and at least one support member. The wheel can be configured to rotate. The one or more arms can be operably coupled to the wheel. The one or more arms can be configured to move from a closed position to a deployed position due to centrifugal force caused by rotation of the wheel. The plate can be made of a non-ferrous conductive material, and can be located adjacent to the one or more magnets when the one or more arms are in the closed position and the deployed position. The at least one support member can be in contact with and can support the wheel and along which the wheel moves. The movement of each of the one or more arms relative to the plate can generate eddy currents that can create magnetic fields opposing the movement of the wheel along the at least one support member.

In some variations, one or more of the following can be implemented either individually or in any feasible combination. The system can further include one or more braking arms operably coupled to the wheel, one or more magnets attached to each of the one or more braking arms, and a rail made of non-ferrous conductive material. The one or more braking arms can pivot relative to the wheel and move adjacent to the rail to generate eddy currents that create magnetic fields opposing movement of the wheel along the at least one support member. The rail can have one or more gaps. The width of the one or more gaps can decrease along the length of the rail.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
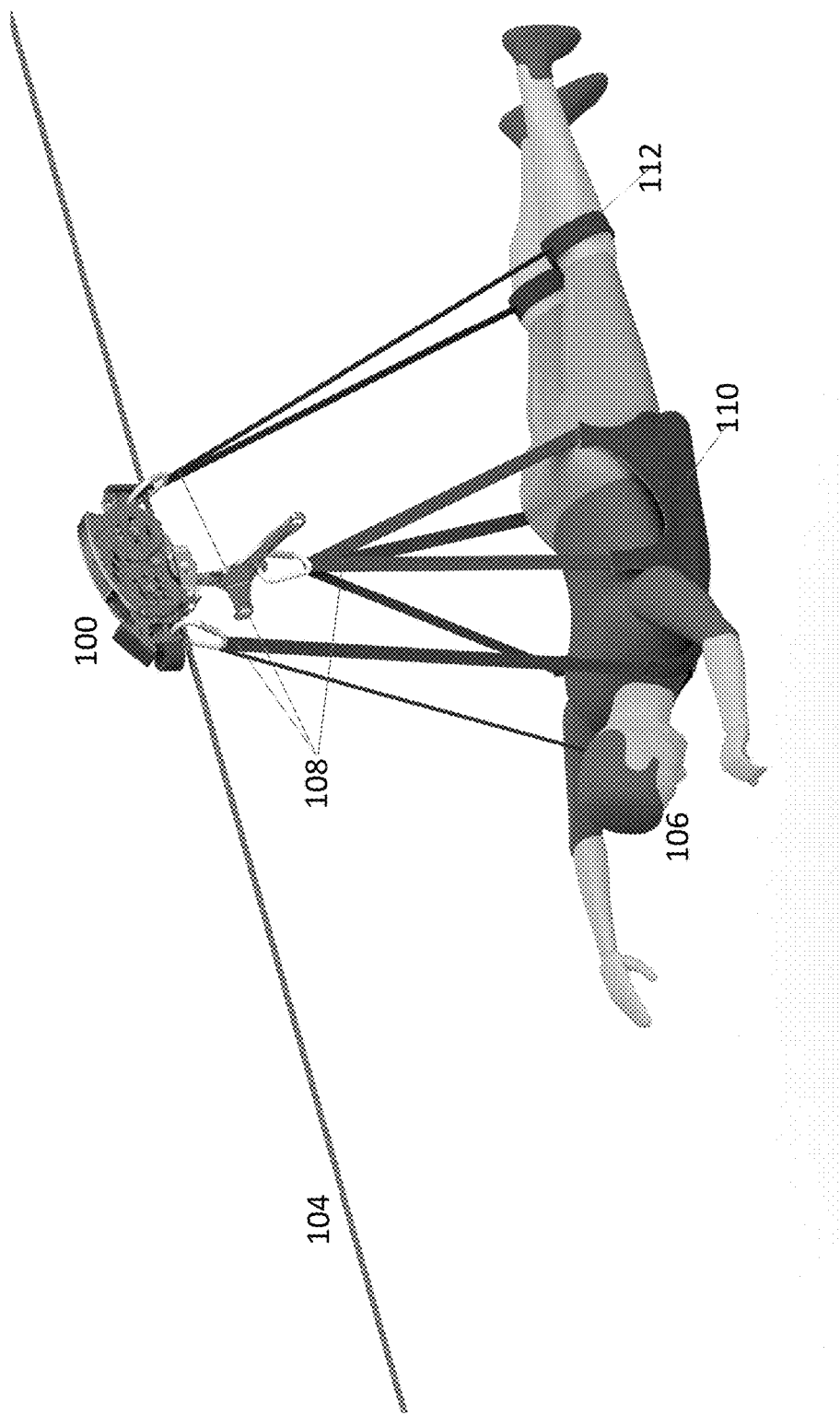
FIG. 1 illustrates a trolley in accordance with some implementations described herein and that carries a rider in a prone position.
Figure 2:
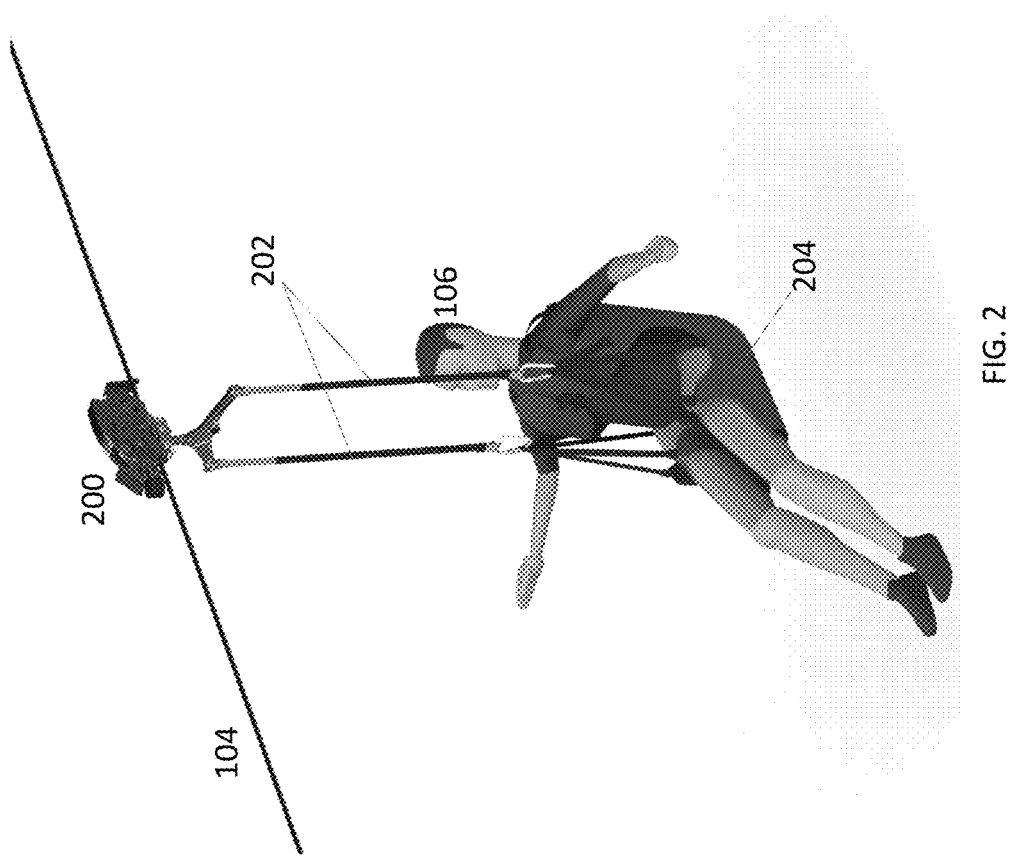
FIG. 2 illustrates a trolley in accordance with some implementations described herein and that carries a rider in a seated position.

FIG. 1 illustrates a trolley 100 (e.g., a trolley for a zip-line or coaster ride) for carrying a rider. The rider may be carried in the prone (e.g., "super hero") position and move over a track 104 (e.g., a zip-line cable or one or more coaster pipes or beams). Track 104 may be made of one or more materials suitable for a zip-line or coaster ride. Trolley 102 can maintain and have attached thereto one or more harness straps 108, a torso brace 110 and one or more leg braces 112 that together form a harness for supporting rider 106. In some implementations, a trolley 200 may be equipped with harness straps 202 and a seat brace 204 to enable rider 106 to be oriented in a sitting position, as shown in FIG. 2.

Figure 3:
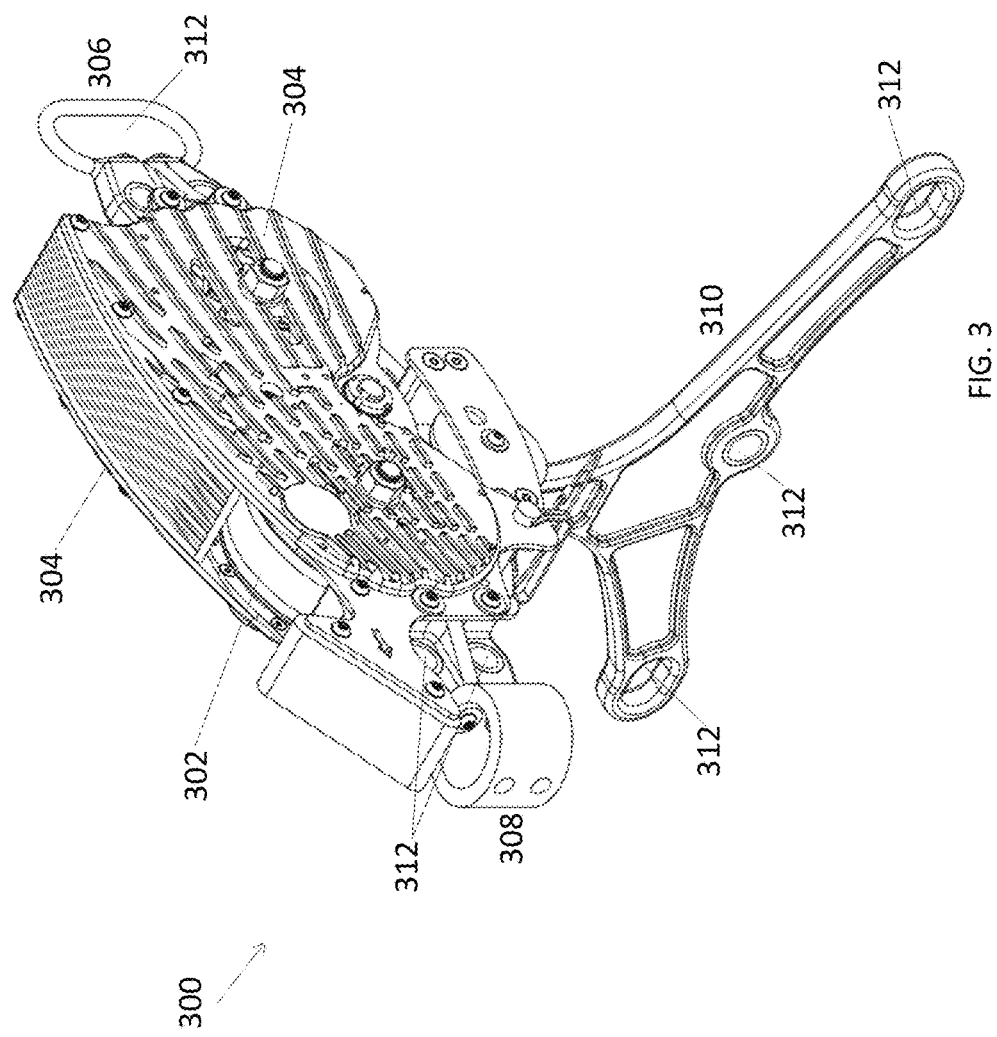
FIG. 3 illustrates structural aspects of a trolley in accordance with some implementations described herein.

FIG. 3 illustrates structural aspects of an implementation of a trolley 300 in accordance with the subject matter described herein. Trolley 300 may include one or more wheel assemblies 302 (only one is partially shown in FIG. 3), two non-ferrous plates 304 encasing the one or more wheel assemblies 302 (one of the two plates 304 is only partially shown in FIG. 3), a strap ring 306, a trolley stopper 308 and a suspension bar 310. Non-ferrous plates 304 can be made of any non-ferrous conductive material (e.g., aluminum, copper, brass, lead, zinc or stainless steel). Strap ring 306, stopper 308 and suspension bar 310 may include one or more suspension locations 312 to which harness straps (e.g., harness straps 108 and/or harness straps 202) may be attached.

Figure 4A:
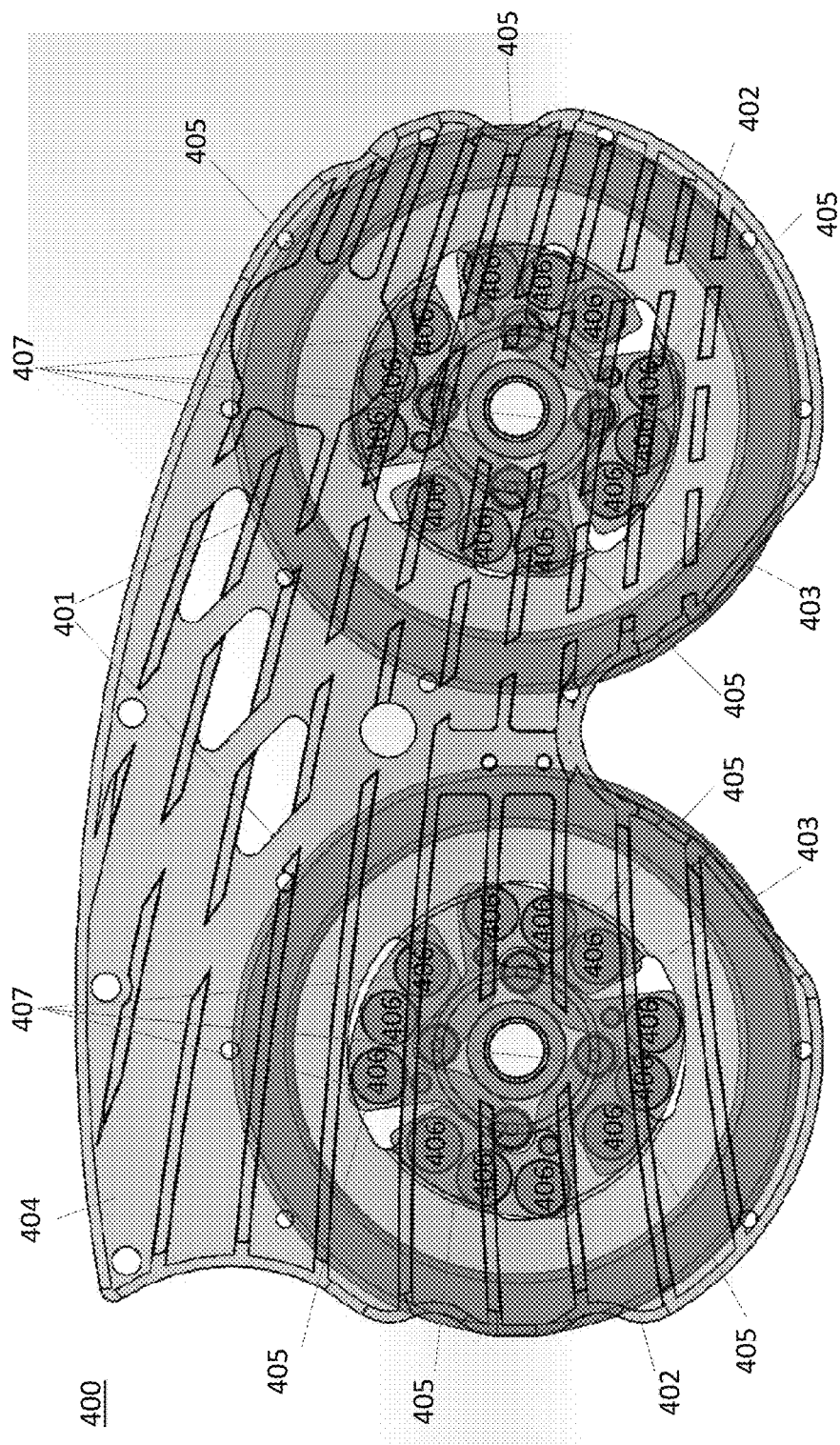
FIG. 4(a) illustrates two wheel assemblies of an apparatus in a closed position in accordance with some implementations described herein.
Figure 6:
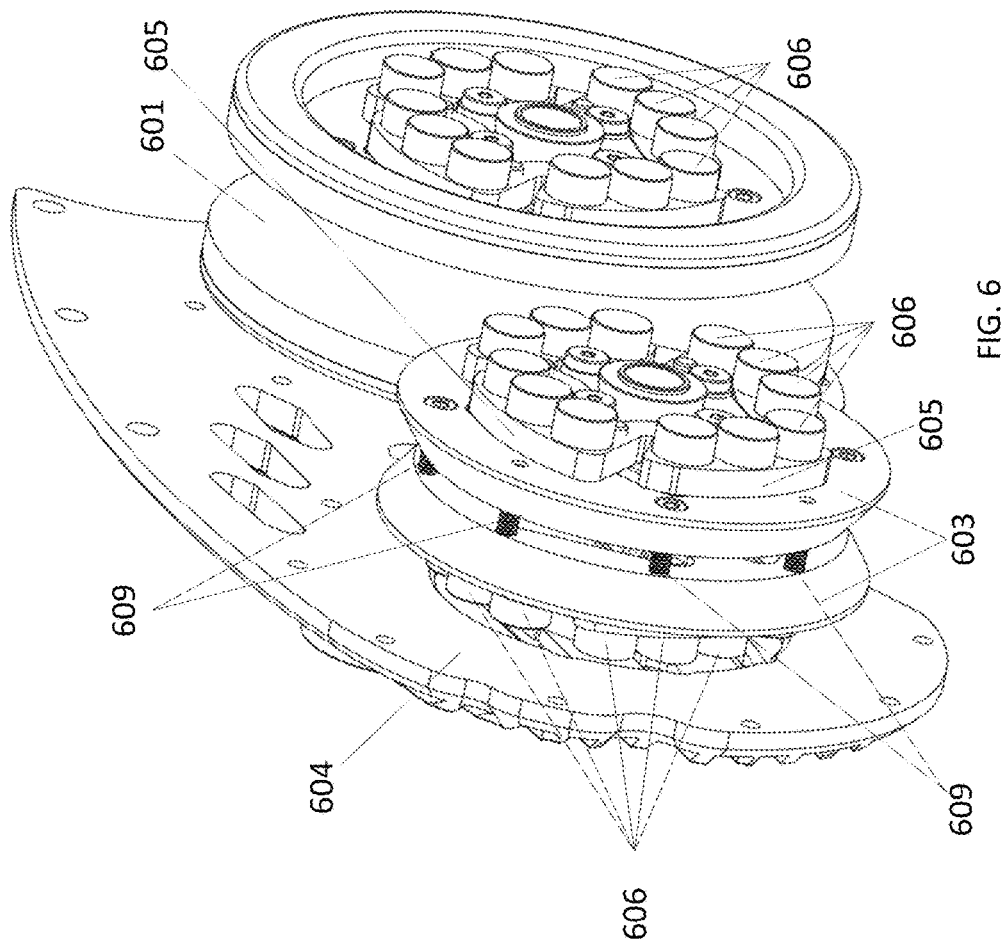
FIG. 6 illustrates a partial wheel assembly and a wheel assembly, wherein both wheel assemblies have four movable arms, each with three magnets, in a closed position, in accordance with some implementations described herein.

FIG. 4(a) illustrates an implementation of a trolley 400 in accordance with the subject matter described herein. Trolley 400 includes wheel assemblies 402 positioned adjacent to a non-ferrous plate 404, that in combination with a second non-ferrous plate (not shown) encases the one or more wheel assemblies to form the body of trolley 400. Each wheel assembly 402 includes a wheel 401 and two inner plates 403 (only one inner plate 403 for each wheel assembly 402 is shown in FIG. 4(a)). For sake of reference, FIG. 6 shows an inner plate 603 positioned within a wheel 601. Inner plate 403 may include one or more movable arms 405 that are pivotally attached to inner plate 403 at a pivot point 407. Each movable arm 405 may include one or more magnets (e.g., permanent magnets) 406 and/or a removable cartridge (not shown) insertable into the arm 405 that contains one or more magnets 406. While wheel assemblies 402 depict four movable arms 405 pivotally attached to inner plate 403, any number of movable arms 405 may be provided depending on the desired configuration and amount of braking force desired. Each moveable arm 405 is also shown with three magnets 406; however, each movable arm 405 may contain whatever number of magnets 406 as necessary for providing the desired braking force. In some embodiments, one or more magnets 406 may be contained in a removable cartridge that is inserted into a movable arm 405, rather than the one or more magnets 406 being positioned directly in the movable arm 405. In this manner, a single moveable arm can be made scalable and customizable so as to accommodate multiple configurations of magnets 406.

Wheel assemblies 402 are also shown with movable arms 405 positioned in a closed state where none of movable arms 405 are deployed to any extent. Each movable arm 405 may be biased and held in this position by some external static force, such as a spring (e.g., an extension spring or torsion spring). In this closed position, movable arms 405 and magnets 406 contained therein are directly adjacent to a first section (shown at reference numeral 502 in FIG. 5) of a non-ferrous plate 404.

When trolley 400 moves along a track so as to cause wheel assemblies 402 to rotate, that rotation will impart centrifugal force upon each movable arm 405 so as to cause each movable arm 405 to pivot about pivot point 407 when the centrifugal force is great enough so as to overcome any opposing force applied against each movable arm 405, such as frictional forces and/or spring forces.

Figure 4B:
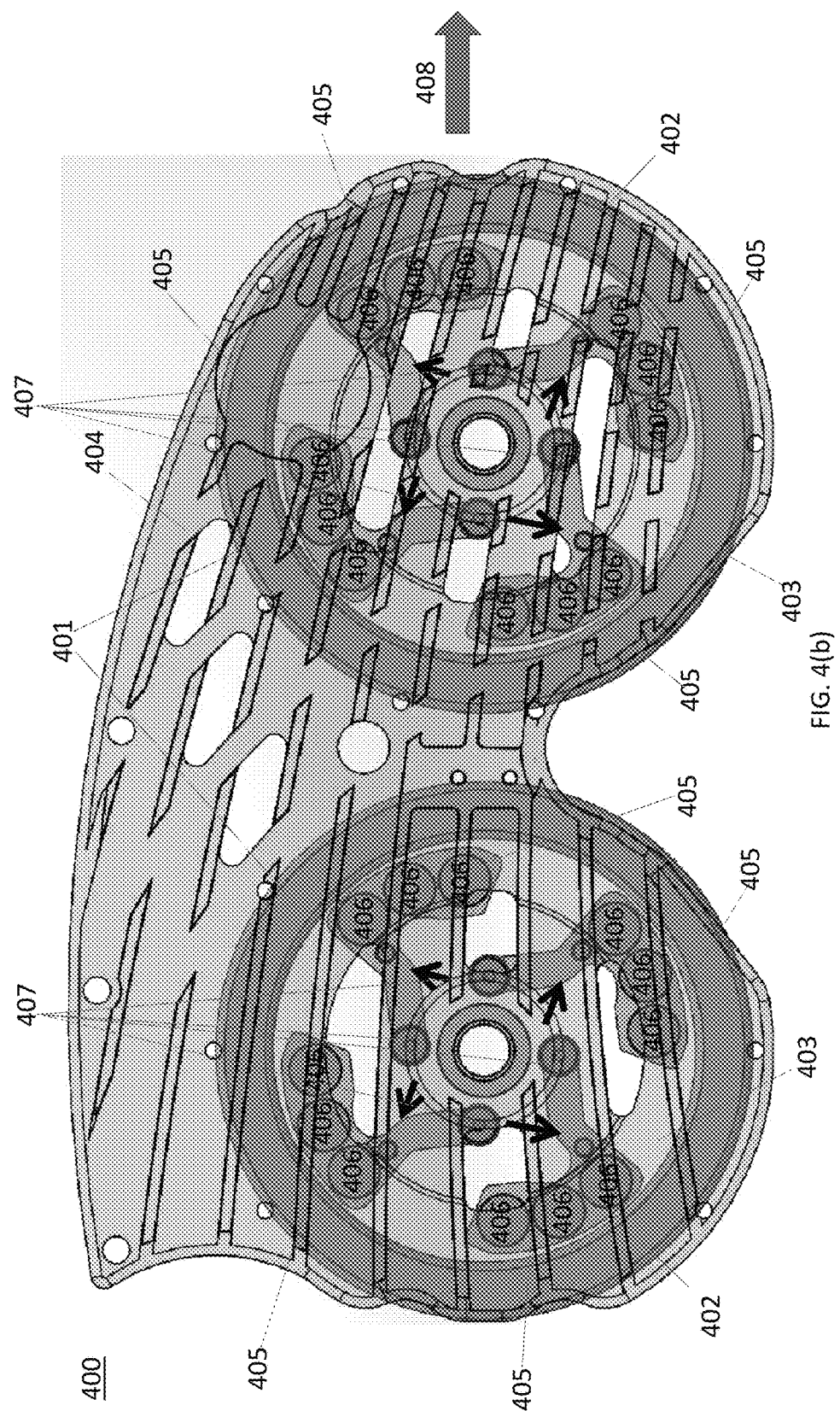
FIG. 4(b) illustrates the two wheel assemblies depicted in FIG. 4(a) in an open position in accordance with some implementations described herein.

FIG. 4(b) shows movable arms 405 being positioned in a fully deployed state such that magnets 406 are now positioned directly adjacent to a second section (shown at reference numeral 503 in FIG. 5) of non-ferrous plate 404. While FIG. 4(b) depicts movable arms 405 in a fully open position, movable arms 405 may alternately be positioned to any partially deployed extent, as well as depending on the speed of rotation of each wheel assembly 402 and the resulting centrifugal force imparted upon each movable arm 405. More specifically, when trolley 400 moves along a track in the direction of the arrow 408 shown in FIG. 4(b) so as to cause wheel assemblies 402 and inner plates 403 to rotate, movable arms 405 experience centrifugal force and pivot about pivot point 407 to move in a counterclockwise direction as indicated by the arrows shown toward the center of each wheel assembly 402. Each wheel assembly 402 may include a static force (e.g., a spring) imparted upon each movable arm 405 to control what amount of centrifugal force causes each movable arm 405 to pivot about its pivot point 407. For example, an extension spring may be attached to each movable arm 405 (see 808 in FIG. 8) to oppose the pivoting movement of movable arm 405 about its pivot point 407 to prevent sudden (e.g., jerky) movements of movable arm 405 and/or provide for controlled, progressive movement of movable arm 405 from a closed position to a partially or fully deployed position.

The progressive movement of each movable arm 405 may provide for progressive braking of each wheel assembly 402 in trolley 400 due to the interaction between the one or more magnets 406 arranged in each movable arm 405 and non-ferrous plate 404. More specifically, each magnet 406 possesses a magnetic field that extends through adjacent non-ferrous plate 404. When each magnet 406 is moved relative to non-ferrous plate 404, the magnetic field of each magnet 406 moves through non-ferrous plate 404 and induces a circular flow of electric current in non-ferrous plate 404 at the leading edge of that magnet in one direction (e.g., counterclockwise) and a circular flow of electric current in non-ferrous plate 404 at the trailing edge of that magnet in the opposite direction (e.g., clockwise). These induced circular electric currents are called eddy currents and create magnetic forces within non-ferrous plate 404 in opposing directions. That is, the eddy currents at the leading edge of a magnet 406 create a magnetic force within non-ferrous plate 404 that is generally perpendicular to non-ferrous plate 404 in one direction (e.g., to the left) and the eddy currents at the trailing edge of that same magnet create a magnetic force within non-ferrous plate 404 that is generally perpendicular to non-ferrous plate 404 in the opposite direction (e.g., to the right). These opposing magnetic forces have the net result of imparting a drag force on the movement of each magnet 406 relative to non-ferrous plate 404.

The closer each magnet 406 is to non-ferrous plate 404, the greater the eddy currents generated in non-ferrous plate 404, the greater the oppositional forces generated within non-ferrous plate 404 and the greater the drag force imparted upon the movement of each magnet 406 relative to non-ferrous plate 404. It also follows that the more magnets 406 interacting with non-ferrous plate 404, the greater the eddy currents generated in non-ferrous plate 404, the greater the oppositional forces generated within non-ferrous plate 404 and the greater the drag force imparted upon the movement of each magnet 406, collectively, relative to non-ferrous plate 404. It further follows that the greater the thickness of non-ferrous plate 404 is, the greater the eddy currents generated in non-ferrous plate 404, the greater the oppositional forces generated within non-ferrous plate 404 and the greater the drag force imparted upon the movement of each magnet 406, collectively, relative to non-ferrous plate 404. Accordingly, implementations of the subject matter described herein contemplate providing for various distances between non-ferrous plate 404 and magnet(s) 406, various numbers of magnets 406 within in movable arm 405 and various thicknesses of non-ferrous plate 404 so as to provide for different amounts of braking force imparted to each wheel assembly 402.

Figure 5:
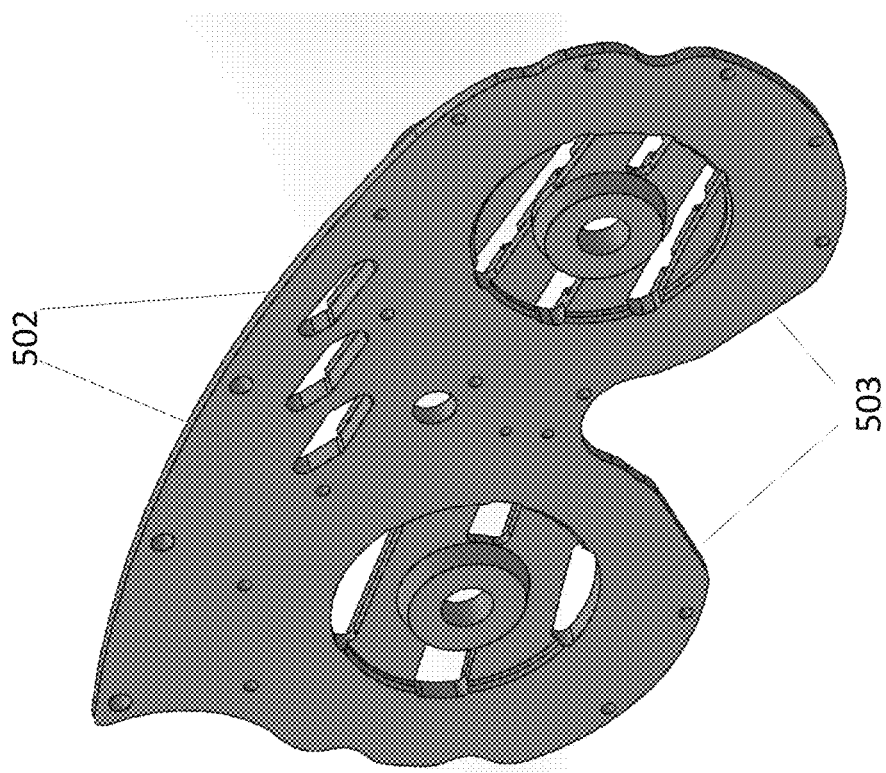
FIG. 5 illustrates an implementation of a non-ferrous conductive plate and in particular the surface of that plate that is directly adjacent to two wheel assemblies in accordance with some implementations described herein.

One way to vary the distances between non-ferrous plate 404 and one or more magnets 406 and/or the thickness of non-ferrous plate 404 is to machine a non-ferrous plate 404 with varying steps or depths. For example, as shown in FIG. 5, a non-ferrous plate 500 may have a first section 502 and a second section 503, where the first section 502 is stepped down or cut deeper in non-ferrous plate 500 than second section 503. Thus, when a wheel assembly (e.g., wheel assembly 402 shown in FIG. 4(a)) containing one or more magnets 406 is in position directly adjacent to non-ferrous plate 500, the one or more magnets 406 are physically closer to second section 503 when those magnets 406 are positioned directly adjacent second section 503 than magnets 406 are to first section 502 when magnets 406 are positioned directly adjacent to first section 502. In other words, the distance between magnets 406 and second section 503 will be less than the distance between magnets 406 and first section 502 when the magnets are directly adjacent each section, respectively. Either way, however, the implementations of the subject matter described herein involve a magnetic field always being applied and some degree of braking being applied because the magnets in the movable arms are always adjacent the non-ferrous plate so as to generate eddy currents at all times, even if minimal.

Consequently, and with reference to non-ferrous plate 500 in FIG. 5 having a stepped configuration, when movable arms 405 are in a closed position, each magnet 406 would be positioned directly adjacent to first section 502 and, upon rotation of wheel assembly 402 relative to non-ferrous plate 500, will generate eddy currents based on the magnetic fields of magnets 406 interacting with first section 502 of non-ferrous plate 500 and impart a certain drag force on the movement of those magnets 406 based on the number of magnets in the movable arms (e.g., three), the distance between those magnets 406 and first section 502 (e.g., 0.125 inches) and the thickness of the plate at first section 502. As the speed of rotation of wheel assembly 402 increases, so will the resulting centrifugal force on each movable arm 405, causing each movable arm 405 to pivot to some extent about its pivot point 407 and move outwardly from the center of wheel 401. Each magnet 406 in each movable arm 405 then moves into a position where it is adjacent second section 503 of non-ferrous plate 500. Depending on how much each movable arm 405 moves due to the centrifugal force and an applied force (e.g., a spring), some magnets 406 will be entirely directly adjacent to second section 503 and others will be only partially directly adjacent to second section 503. For example, when movable arms 405 are in a fully open position as depicted in FIG. 4(b), all magnets 406 will be essentially completely directly adjacent to second section 503 of non-ferrous plate 500 shown in FIG. 5.

Continuing with the example, as wheel assembly 402 rotates relative to non-ferrous plate 500, eddy currents will be generated based on the magnetic fields of magnets 406 interacting with first section 502 of non-ferrous plate 500 and impart a certain drag force on the movement of those magnets 406 based on the number of magnets 406 in the movable arms 405 (e.g., three) and also the distance between those magnets 406 and second section 503 (e.g., 0.0625 inches), which is closer to the magnets 406 than first section 502, that is, for example 0.0625 inches versus 0.125 inches. This closer distance provides for a greater amount of eddy currents generated per magnet 406 within second section 503 than in first section 502. In other words, as wheel assemblies 402 rotate at a greater speed, movable arms 405 pivot further outward due to greater centrifugal force and apply an increasingly greater drag force on the movement of magnets 406 (and the entirety of each wheel assembly 402) due to magnets 406 being gradually in closer proximity to non-ferrous plate 500, namely second section 503, and progressively more magnets 406 (e.g., one magnet 406 versus three magnets 406) being directly adjacent to second section 503 of non-ferrous plate 500. The thickness of the plate 404 at the second section 503 is also greater.

In this respect, trolley 400, and other trolleys and trolley systems in accordance with the subject matter described herein, may be configured to become increasingly safer (e.g., increased braking force) as the speed of the trolley increases along a zip-line or coaster track(s), due to the magnitude of the generated eddy currents being directly proportional to the speed of each magnet in the moveable arms (e.g., 405) relative to the non-ferrous plates (e.g., 500) of the trolley. The progressive braking of the wheel assemblies (e.g., 402) provides for effective braking performance for riders of varying weights, i.e., the same trolley may accommodate a rider that weighs 60 pounds, as well as a rider that weighs 300 pounds, without modifying or otherwise configuring the trolley between rides. Each rider will feel the same amount of braking force, as the gravity of their weights may apply a different force, which may aid or oppose the braking.

Implementations of the non-ferrous plates according to the subject matter described herein may have stepped sections (e.g., first section 502 and second section 503 shown in FIG. 5) of varying areas. In FIG. 5, the total area of first section 502 appears to be less than the total area of second section 503. But, in other implementations of the subject matter described herein, first section 502 depicted in FIG. 5 may have an area that is larger than that of second section 503. In general, the non-ferrous plate can be designed with an internal surface that is stepped to provide any number of varying distances between the non-ferrous plates and one or more magnets positioned in a wheel assembly of a trolley or trolley system, including, for example, multiple stepped sections (e.g., more than two) or a single large section that is sloped, rather than stepped. Also, the distance between any section or portion of a non-ferrous plate and one or more magnets of a wheel assembly of a trolley or trolley system can be specifically configured to achieve any desired braking for any desired speed of rotation of the wheel assembly.

Figure 7:
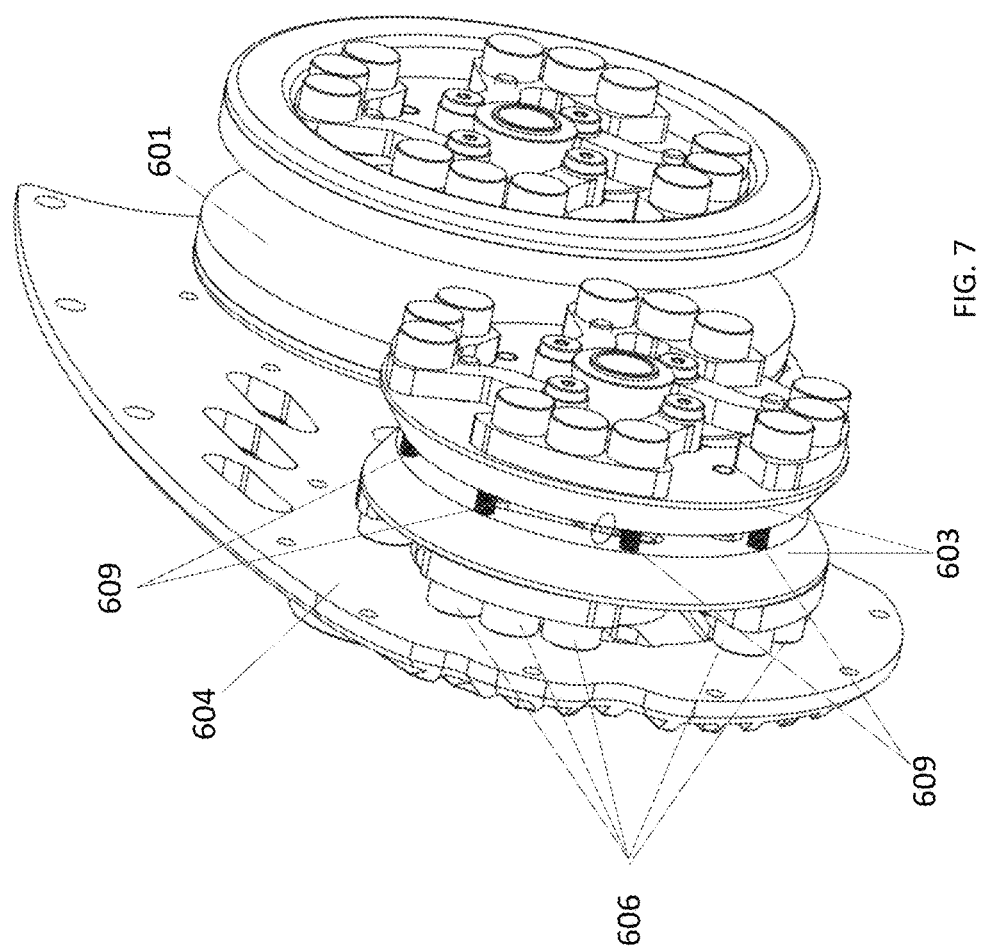
FIG. 7 illustrates the wheel assemblies depicted in FIG. 6, wherein the four movable arms are each in a fully deployed position in accordance with some implementations described herein.

FIG. 6 shows two wheel assemblies according to some implementations of the subject matter described herein. The first wheel assembly positioned in the foreground in FIG. 6 is a partial wheel assembly, as wheel 601 has been removed to better show two inner plates 603, including how inner plates 603 are positioned relative to each other and relative to wheel 601. In particular, fasteners (e.g., screws) 609 maintain inner plates 603 in place with respect to each other and within wheel 601. FIG. 6 also shows further detail of how movable arms 605 has magnets 606 are arranged on inner plates 603, particularly in a closed position. FIG. 7 illustrates the same two wheel assemblies shown in FIG. 6, but with movable arms 605 deployed in some degree of an open position.

Figure 8:
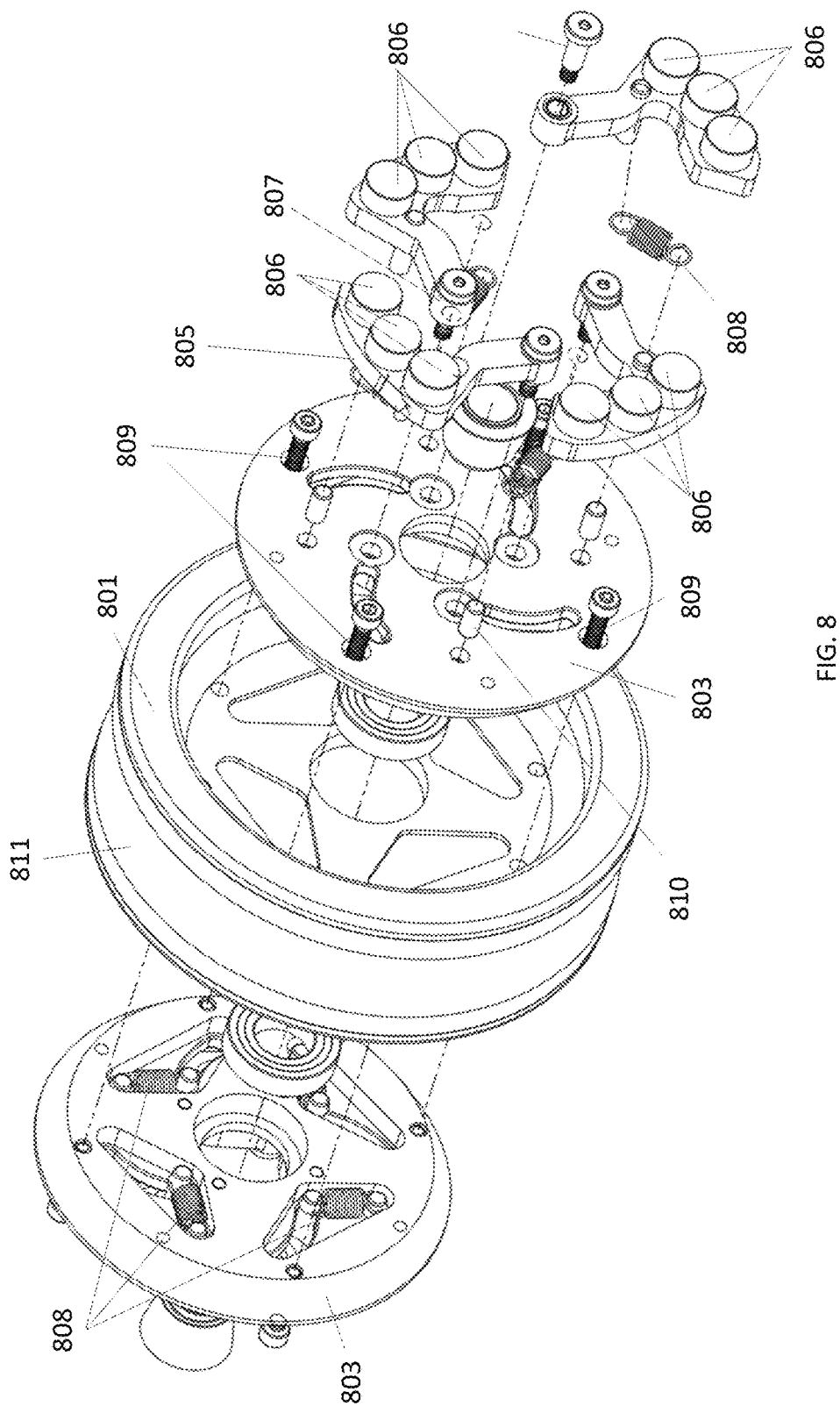
FIG. 8 illustrates an exploded view of a wheel assembly of a trolley apparatus in accordance with some implementations described herein.

FIG. 8 illustrates an exploded view of an implementation of a wheel assembly 800 according to the subject matter described herein. Wheel assembly 800 may include a wheel 801, two inner plates 803 connected to each other via fasteners 809, four movable arms 805 on each inner plate 803 that pivot about pivot points 807 (which may be fastened by any suitable means to inner plate 803), three magnets 806 on each movable arm 805, and springs 808. Each spring 808 is attached to a single movable arm 805 and a single inner plate 803 by way of a spring pin 810, as shown in FIG. 8, to prevent sudden (e.g., jerky) movements of movable arm 805 so that arms 805 smoothly (e.g., gradually) move from a closed position to an open position and, more particularly, to control at what magnitude of centrifugal force each movable arm 805 will begin to pivot about its pivot point 807. In some implementations, spring 808 may instead, or additionally, be a torsion spring incorporated with the pivot point 807.

The wheels of the trolleys or trolley systems described herein may be made of different materials, such as plastic, aluminum, steel, or any other material. The wheels can have rubber, urethane, or any other similar material outside. The wheels may have a contact portion (see 811 in FIG. 8) of any one of various profiles to accommodate various types of tracks, such as a cable, pipe or other extruded or profiled track. The texture of the contact portion may also be configured with any one of various textures. The contact portion can have any value of hardness, such as any durometer value.

Figure 9A:
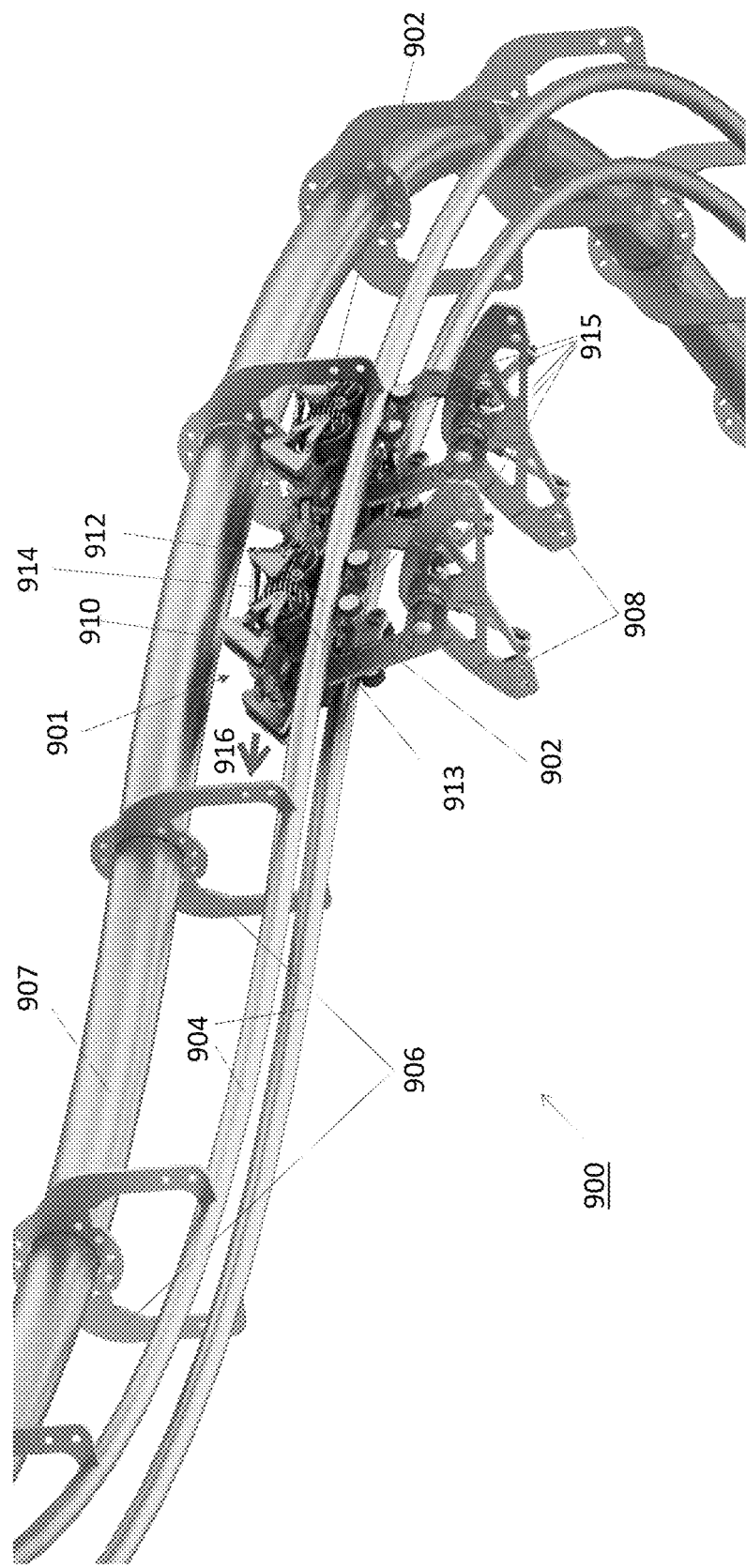
FIG. 9(a) illustrates a system in accordance with some implementations described herein that includes a trolley system configured to move along pipes.

FIG. 9(a) illustrates a coaster system 900 configured with a trolley system 901 having four trolleys 902. In this particular implementation, each trolley 902 includes two wheel assemblies. Some implementations may involve two trolleys connected in tandem. Some implementations may involve two trolleys connected together in tandem and also connected together in series. Trolley system 901 may move along pipes 904 by way of the wheel assemblies in each trolley 902 rolling along pipes 904, for example, in the direction shown by arrow 916. Pipes 904 may be positioned and maintained in parallel by one or more frames 906 and a main support 907. In some implementations, coaster system 900 may include only one trolley 902.

In some implementations, the wheel assemblies of the trolley may move instead along a cable or beam.

Figure 9B:
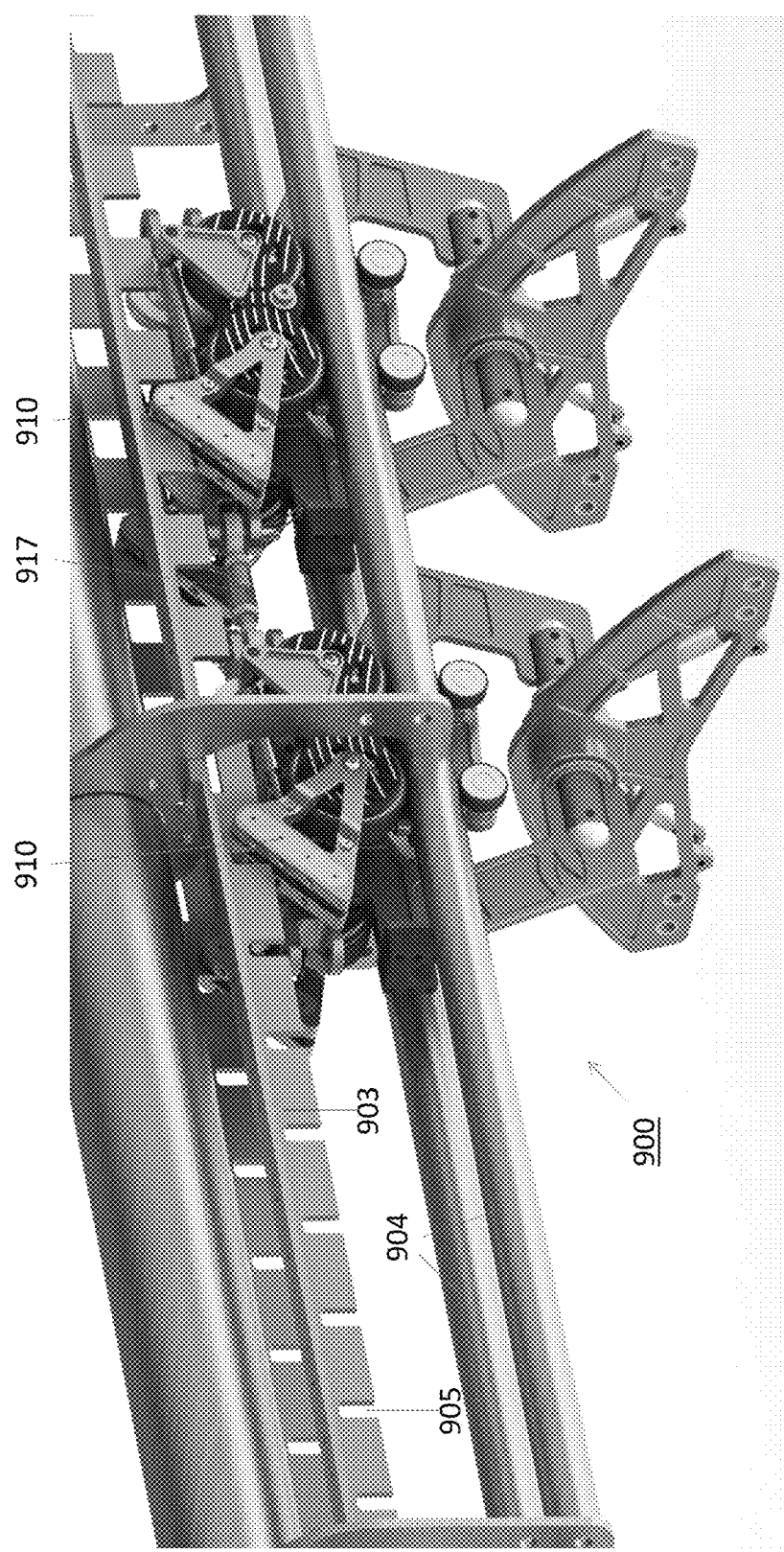
FIG. 9(b) illustrates a system in accordance with some implementations described herein that includes the trolley system depicted in FIG. 9(a) and also two overhead non-ferrous conductors that interact with the trolley system.

One or more of trolleys 902 in FIG. 9(a) may also be configured with one or more braking arm assemblies 910. Braking arm assemblies 910 may be attached to a gas spring 914 and indirectly to a support bracket 912. As shown in FIGS. 9(a) and 9(b), braking arm assemblies 910 and support bracket 912 may both be connected to a trolley 902. Each braking arm assembly 910 may be pivotally attached to a trolley 902 by an appropriate fastener or joint. In some implementations, support bracket 912 can be attached to a wheel assembly of trolley 902 by fasteners and be non-movable with respect to the trolley 902 to which it is attached. Gas spring 914 may pivot with respect to the braking arm assembly 910 and/or support bracket 912. Trolley system 901 may include support rollers 915 to provide additional support for maintaining each trolley 902 on pipes 904 during translation. Trolley system 901 may include one or more trolleys 902 that possess a suspension structure 908 and different types of straps (e.g., straps 108 in FIG. 1 and 202 in FIG. 2) suspended from suspension structures 908 so that riders can experience the activity in different orientations.

Implementations of system 900 may have a non-ferrous track fin 903 attached to frames 906 as shown in FIG. 9(b). Track fine 903 may be made of any non-ferrous material, such as aluminum, copper, brass, lead, zinc or stainless steel, any combination thereof and/or the like. Fin 903 may have one or more gaps 905 that may be of equal dimension or, as shown in FIG. 9(b), varying dimension. Gaps 905 may get progressively wider or progressively narrower, depending on the direction of travel of the trolley system along pipes 904. One or more braking arm assemblies 910 are shown in FIG. 9(b) to be positioned adjacent to track fin 903.

In some implementations, one or more trolleys may include a friction pad (not shown) to provide additional braking, including stopping the trolley and/or trolley system from moving along a zip line or coaster track(s). The friction pad can be made of cellulose, aramid, sintered glass, synthetic materials mixed with varying proportions of flaked metals, ceramics, any other friction pad material, and/or any combination thereof.

Figure 9C:
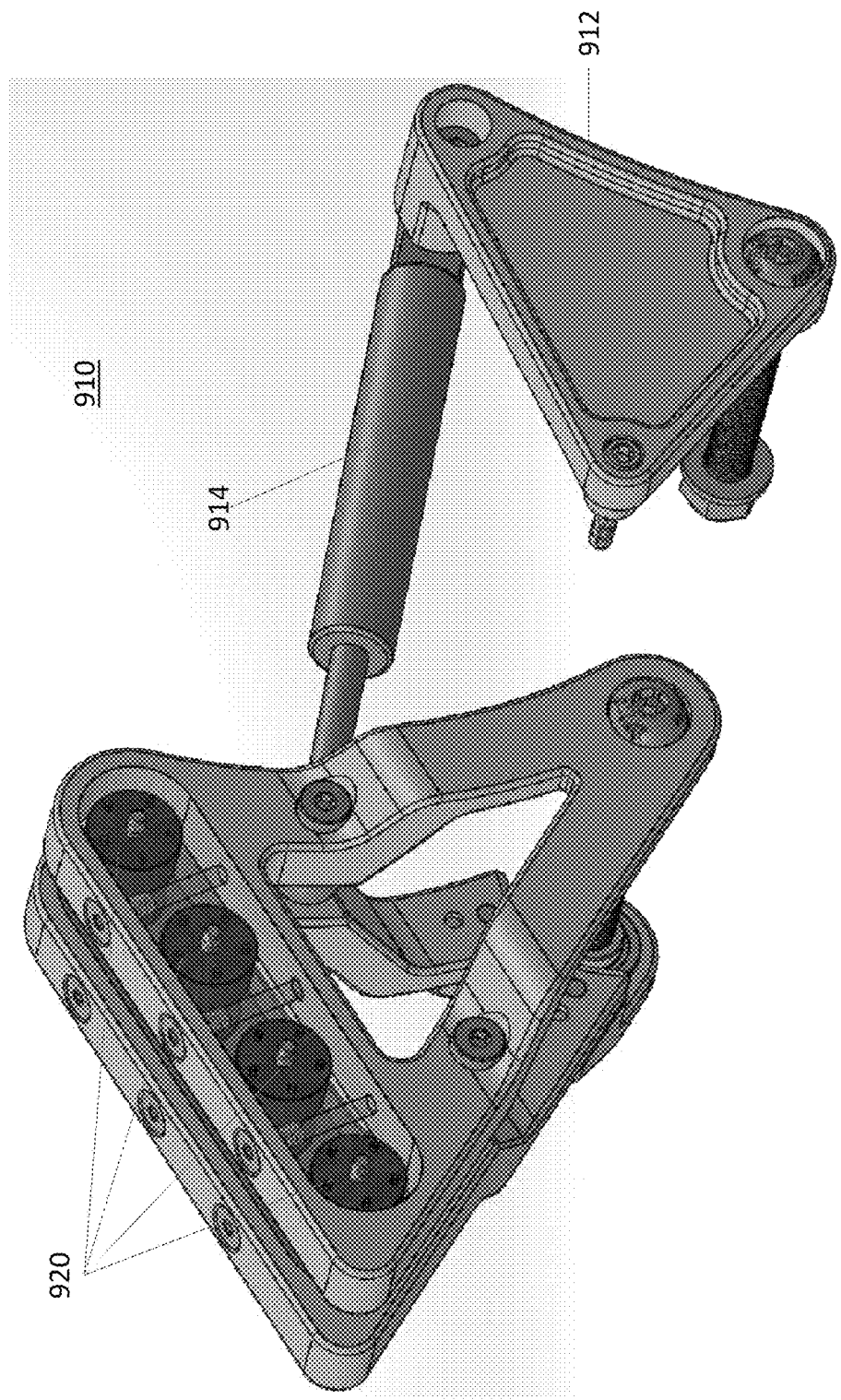
FIG. 9(c) illustrates an implementation of a braking arm assembly of the trolley system depicted in FIG. 9(a) in accordance with some implementations described herein.

Referring to FIG. 9(c), the braking arm assembly 910 may include one or more magnets (e.g., one or more permanent magnets) 920. In one implementation, each braking arm assembly 910 can be scalable in that magnets 920 can be added and removed as needed. In some embodiments, a cartridge (not shown) containing one or more magnets may be inserted into an opening in a braking arm assembly.

The one or more magnets 920 in braking arm assemblies 910 generate eddy currents as they move relative to and adjacent to non-ferrous fin 903, as shown for example in FIGS. 9(a) and 9(b). In so doing, the eddy currents create an opposition force that slows down trolley system 901 moving along pipes 904. This braking force can be independent of or in addition to the braking force provided by the wheel assembly in each trolley 902. While gas spring 914 associated with each braking arm assembly 910 serves to rotate each braking arm assembly 910 about pivot point 913 away from track fin 903, inertial force from the movement of trolley 902 along pipes 904, as well as initial drag force from eddy currents generated by at least one magnet in the braking arm assembly 910 interfacing with track fin 903, provides a force that rotates the braking arm assembly 910 upward toward track fin 903, so as to cause one or more of magnets 920 to interact with fin 903. The interaction and direct adjacency between magnets 920 of a braking arm assembly 910 and fin 903 can be gradual. For example, initially only a first pair of magnets 920 may interact or be immediately adjacent fin 903. Gradually, or immediately, all pairs of magnets 920 may be on both sides of fin 903, thereby causing the braking to be stronger and more effective.

In one implementation, the thickness of fin 903 can be such that a first section of fin 903 has one thickness and a second section of fin 903 has a different thickness. Additional sections of fin 903 may have still further different thicknesses, depending on the implementation, so as to provide varying degrees of braking force. In some implementations, the thickness of fin 903 can be gradually decreased—either in step/terrace form or in a continuous manner—throughout the entire length of fin 903. In some implementations, fin 903 may include two or more materials, e.g., in layers.

Some implementations of the subject matter may involve a trolley having an actuator, instead of or in addition to gas spring 914, which controllably and selectively moves one or more braking arm assemblies 910 so as to interact with or latch with the track fin. Some implementations may further involve actuating the actuator using a remote computer system that interacts with and controls the actuator. In the context of system 900 shown in FIGS. 9(a) and 9(b), for example, trolley system 901 may include a tracker that detects a spatial location of trolley system 901 along pipes 904. The tracker can be activated (that is, turned on) for the entire zip-line or coaster ride. In this implementation, one or more trolleys 902 in trolley system 901 may include an actuator instead of gas spring 914. The tracker and actuator can be communicatively coupled to a remote server computer via a communication network, such as one or more of a local area network, a wide area network, internet, intranet, Bluetooth network, infrared network, any other network, and any combination thereof.

The remote server computer can control the activation of the actuator to cause one or more braking arm assemblies 910 of the trolley system 901 to interact with or latch to fin 903 so as to cause trolley system 901 to decelerate and even stop. In some implementations, the remote serve computer can control the deactivation of the actuator to cause one or more braking arm assemblies 910 to pivot away from and unlatch from fin 903 so as to cause trolley system 901 to accelerate. Activation and deactivation of the actuator by the server computer may be based on the server computer identifying the location of another trolley system 901 ahead on the same track and determining whether that other trolley system is within a threshold distance. If the other trolley system is within a minimum threshold distance, the sever computer can activate the actuator so as to cause the trolley system 901 to brake to prevent it from colliding with the trolley system ahead of it. If the distance between the trolley system 901 and the other trolley system is more than a minimum threshold distance the sever computer can decide not to activate the actuator. Further, in the implementation where the braking is controlled by the remote server computer by activating and deactivating the actuator, non-ferrous fin 903 does not need to and may not have include gaps 905.

In some implementations, a friction pad may be included on one or more trolleys and may be actuated so as to be pressed against track fin 903 to provide additional braking force. The friction pad, for example, may be positioned on the top of a trolley and dimensioned so as to be spaced between two or more braking arm assemblies. The friction pad may also be parallel to and spaced vertically below the track fin. The friction pad may also be connected to a friction pad actuator installed on the trolley and be moved by the actuator as needed. For example, in a situation where the trolley system must be promptly decelerated or stopped, the remote server computer may signal the friction pad actuator to move the friction pad toward and against the track fin to provide additional braking force to the movement of the trolley system and/or trolley.

Figure 10:
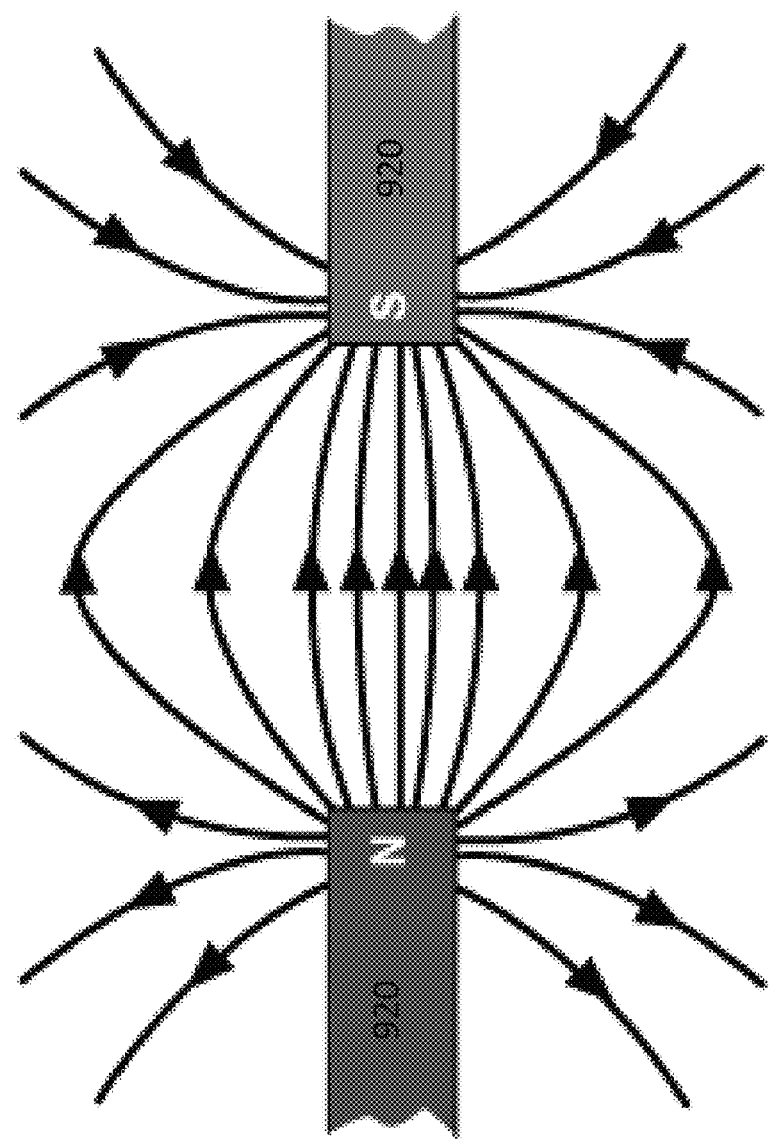
FIG. 10 illustrates the orientation and magnetic fields of two adjacent magnets positioned within a braking arm assembly in accordance with some implementations described herein.

FIG. 10 illustrates the orientation of the magnets 920 in a braking arm assembly 910 positioned one on each side of non-ferrous track fin 903. Magnets 920 may be configured to have opposite polarity as shown in FIG. 10. For example, the north pole of the left magnet 920 may face the south pole of the right magnet 920.

The described braking arm assemblies may be additional to the movable arms in the wheel assembly of a trolley in accordance with the subject matter disclosed herein.

As alluded to above with respect to FIGS. 9(a) and 9(b), non-ferrous fin 903 may include gaps 905 that may be configured as gradually decreasing in dimension, i.e., as the one or more braking arm assemblies 910 move along non-ferrous fin 903, gradually more non-ferrous material interacts with one or more magnets 920 in each braking arm assembly 910 to provide for gradually more braking force. Non-ferrous fin 903 can be implemented within system 900 at a preset distance from the end of the system 900 (e.g., 40-80 feet before pipes 904 end, i.e., 40-80 feet before the end of the ride) or may traverse the entire distance of the ride from start to finish, particularly in those implementations involving one or more actuators for activating one or more braking arm assemblies and that are controlled by a remote server computer. In some implementations, two or more tracks fins may be incorporated into the ride for additional braking force.

Although a few variations have been described in detail above, other modifications can be possible. For example, the logic flows or sequences described herein do not require the particular order shown, or sequential order, to achieve desirable results. Further, the features described in different implementations are interchangeable and/or additive to create further implementations, which are also within the scope of this patent application. Other implementations may be within the scope of the following claims.

What is claimed is:

1. A trolley comprising:
a wheel configured to rotate;
one or more arms operably coupled to the wheel, the one or more arms configured to move from a closed position to a deployed position due to centrifugal force caused by rotation of the wheel;
one or more magnets attached to each of the one or more arms, each magnet having a first surface that is closest to a corresponding arm of the one or more arms, a second surface that is farthest from the corresponding arm, and at least a third surface that connects the first surface with the second surface; and
a plate made of non-ferrous conductive material and located adjacent to the second surface of each magnet of the one or more magnets when the one or more arms are in the closed position and the deployed position, wherein the movement of each of the one or more arms relative to the plate generates eddy currents that create magnetic fields opposing the rotation of the wheel, the plate having a first section and a second section, the first section being adjacent to the one or more magnets when the one or more arms are in the closed position, the second section being adjacent to the one or more magnets when the one or more arms are in an open position, a distance between the second surface of each magnet and the first section when the one or more arms are in the closed position being more than a distance between the second surface of each magnet and the second section when the one or more arms are in the open position.

2. The trolley of claim 1, further comprising:
one or more braking arms operably coupled to the wheel; and
one or more magnets attached to each of the one or more braking arms, wherein:
the one or more braking arms pivot relative to the wheel and into a position adjacent to a rail made of non-ferrous conductive material, the movement of each braking arm relative to the rail generating eddy currents that create magnetic fields opposing movement of the trolley.

3. The trolley of claim 2, wherein each of the one or more arms is operably coupled to a spring that applies a force opposing movement of the arm.

4. The trolley of claim 2, wherein each of the one or more braking arms is operably coupled to a spring that opposes the moving of each of the one or more braking arms toward the rail.

5. The trolley of claim 4, wherein the spring is a gas spring.

6. The system of claim 2, wherein the rail is clamped to a cable on which the trolley moves.

7. The trolley of claim 1, wherein the amount of eddy currents generated when at least one of the one or more magnets is directly adjacent to the second section is greater than the amount of eddy currents generated when at least one of the one or more magnets is directly adjacent to the first section.

8. The trolley of claim 1, wherein each of the one or more arms is operably coupled to a spring that applies a force opposing movement of the arm.

9. The trolley of claim 1, wherein the wheel, the one or more arms, the one or more magnets, and the plate form at least a part of the trolley.

10. The trolley of claim 1, wherein:
the first section is adjacent to each magnet of the one or more magnets when the one or more arms are in the closed position; and
the second section is adjacent to each magnet of the one or more magnets when the one or more arms are in an open position.

11. The trolley of claim 1, wherein the one or more arms are eight arms, four of the eight arms facing a first direction along an axis of the wheel, other four of the eight arms facing a second direction that is opposite the first direction.

12. The trolley of claim 11, wherein the one or more magnets attached to each of the eight arms are three magnets.

13. The trolley of claim 1, wherein the plate constantly remains within the magnetic field during an entirety of a ride on the trolley.

14. A system comprising:
a wheel configured to rotate;
one or more arms operably coupled to the wheel, the one or more arms configured to move from a closed position to a deployed position due to centrifugal force caused by rotation of the wheel;
one or more magnets attached to each of the one or more arms;
a plate made of non-ferrous conductive material and located adjacent to each magnet of the one or more magnets when the one or more arms are in the closed position and the deployed position;
at least one support member in contact with and supporting the wheel and along which the wheel moves,
wherein the movement of each of the one or more arms relative to the plate generates eddy currents that create magnetic fields opposing the movement of the wheel along the at least one support member, the plate constantly remaining within the magnetic field.

15. The system of claim 14, further comprising:
one or more braking arms operably coupled to the wheel;
one or more magnets attached to each of the one or more braking arms; and
a rail made of non-ferrous conductive material,
wherein the one or more braking arms pivot relative to the wheel and move adjacent to the rail to generate eddy currents that create magnetic fields opposing movement of the wheel along the at least one support member.

16. The system of claim 15, wherein the rail has one or more gaps.

17. The system of claim 16, wherein the width of the one or more gaps decreases along the length of the rail.

\* \* \* \* \*